(No Model.)  2 Sheets—Sheet 1.

M. M. M. SLATTERY.
ELECTRIC METER FOR ALTERNATE CURRENTS

No. 404,801.  Patented June 4, 1889.

WITNESSES
Charles H. Worden
John Morris Jr.

INVENTOR
Marmaduke M. M. Slattery
By R. S. Taylor
His Attorney (No Model.) 2 Sheets—Sheet 2.

M. M. M. SLATTERY.
ELECTRIC METER FOR ALTERNATE CURRENTS.

No. 404,801. Patented June 4, 1889.

WITNESSES
Charles H. Worden
John Morris Jr.

INVENTOR
Marmaduke M. M. Slattery
By R. S. Taylor
His Attorney

UNITED STATES PATENT OFFICE.

MARMADUKE M. M. SLATTERY, OF FORT WAYNE, INDIANA, ASSIGNOR TO THE FORT WAYNE ELECTRIC LIGHT COMPANY, OF SAME PLACE.

ELECTRIC METER FOR ALTERNATE CURRENTS.

SPECIFICATION forming part of Letters Patent No. 404,801, dated June 4, 1889.

Application filed March 14, 1889. Serial No. 303,217. (No model.)

*To all whom it may concern:*

Be it known that I, MARMADUKE M. M. SLATTERY, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention is of an improved form of electric meter adapted for use in the measurement of alternating currents.

Figure 1:
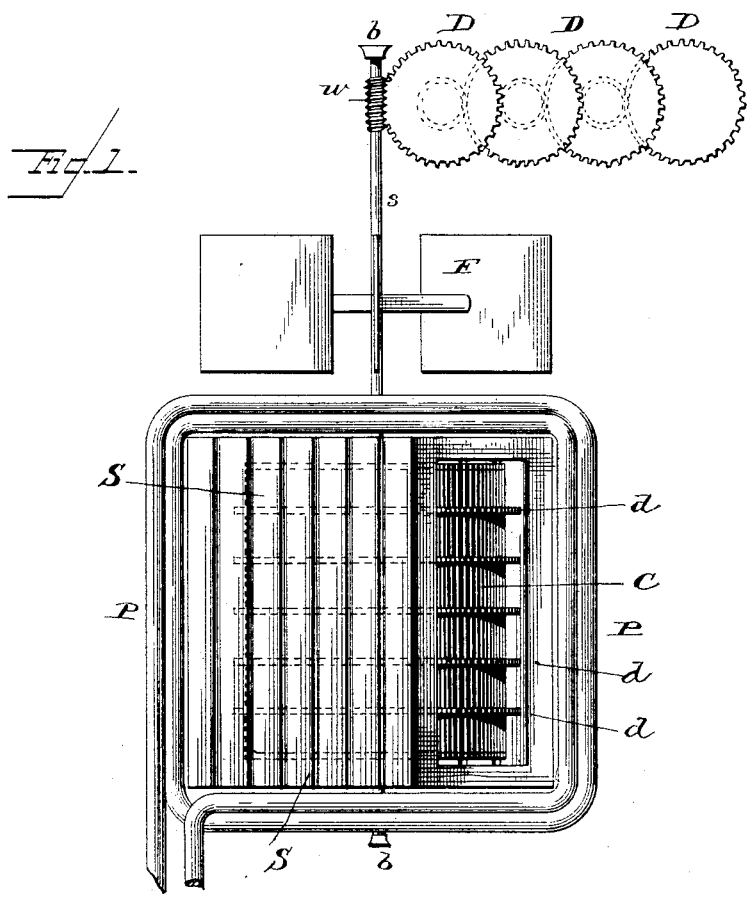
Figure 2:
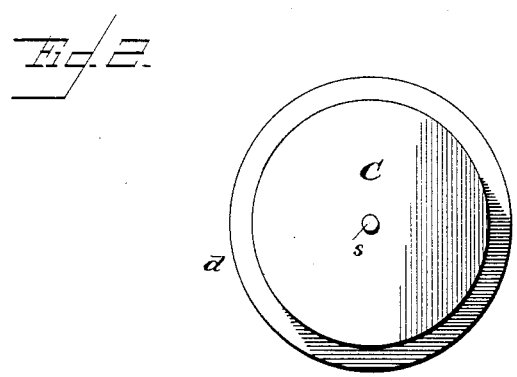
Figure 3:
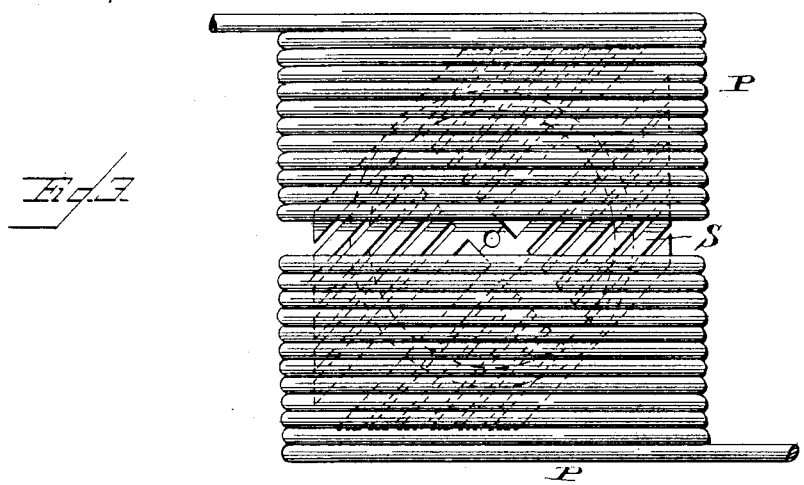
Figure 4:
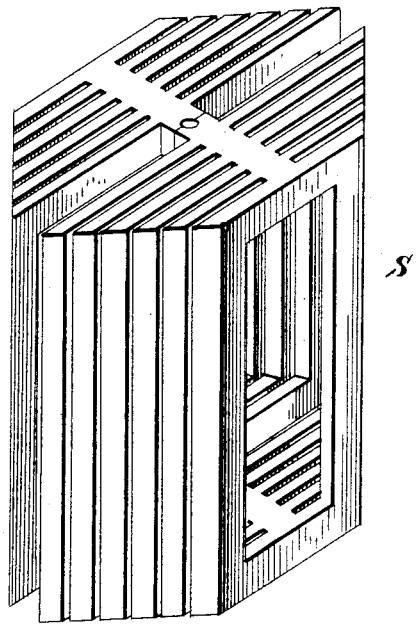
Figure 5:
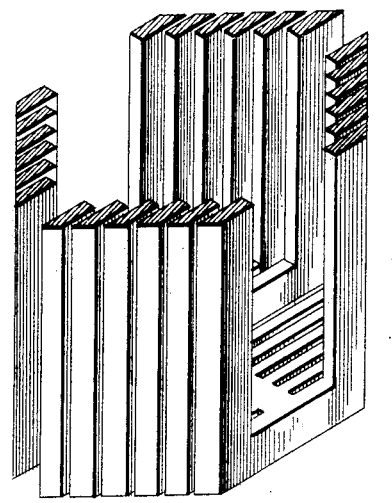

In the drawings, Figure 1 shows an elevation of the working parts of the meter, partly in section. Fig. 2 is a plan view of cylinder and disks, also partly in section. Fig. 3 is a plan view of the top of the coils, showing secondary coil and cylinder in outline. Fig. 4 is a perspective view of the secondary coil S, and Fig. 5 is a similar view, but showing the interior with upper portion of the coil removed.

The same letters denote identical parts in all the figures.

P is a coil of conducting-wire conveying the alternating current to be measured. It performs the function in the operation of the meter of a primary coil, and is so referred to hereinafter.

S is a device in the nature of a coil, which performs the function of a secondary coil in the operation of the meter, and is so hereinafter referred to.

C is a cylinder of copper or other diamagnetic conducting material, having attached to its surface disks $d$ $d$ $d$, of soft iron or like magnetic substance.

The cylinder C is mounted on the shaft $s$, which has bearings at $b$ $b$, and which carries a fan F, and actuates by the worm $w$ a train of gear-wheels, which operate hands upon the dials D D D, by which the revolutions of the cylinder are counted and indicated. The secondary coil S is fixed in position relatively to the primary coil P, so that its central plane shall cut the central plane of the primary coil at an angle of about forty-five degrees, as indicated in the top view of the coils shown in Fig. 3.

The manner of operation of the apparatus is as follows: The passage of the alternating current through the primary coil P creates, by induction, a secondary current of like nature, but contrary movement in the secondary coil S. The cylinder C occupies the relation of a secondary coil to each of the coils P and S and receives currents by induction from each of them. Among all these currents there are attractions and repulsions depending on their parallelism, their distance from each other, and the similarity or dissimilarity of movement in their impulses in time and direction. The cylinder, being free to turn, obeys that force which is the resultant of all the attractions and repulsions operating between the electrical currents induced in it and those flowing in the two coils P and S. The effect of this force is to produce revolution of the cylinder C in the direction of movement from the secondary coil S toward the primary coil P across the least angle between their planes. In an analogous manner the soft-iron disks $d$ $d$ $d$ are subjected at once to the magnetic attractions and repulsions of the two fields of force surrounding the coils P and S, the resultant force of which tends to produce revolution of the disks in the same direction in which the cylinder is impelled by the electrical attractions and repulsions to which its currents are subjected. The vanes of the fan F are made of such superficial area and form that with the least current that is sufficient to actuate the mechanism of the meter they shall retard its speed to the slowest rate consistent with certainty and uniformity of motion. The resistance of the atmosphere to the revolution of the fan increases with the square of its velocity, and the velocity of the cylinder, unchecked by friction or any other retarding influence, increases with the square of the actuating-current; hence the retarding influence of the fan, properly adjusted, just compensates for the accelerating influence of an increasing current, and the speed of the cylinder is made proportional to the current flowing in the principal coil P, so that the number of revolutions of the cylinder, as indicated by the dial-hands, is a true measure of the current which has passed through the coil P within a given time.

In the construction of this apparatus it is desirable that the secondary coil shall be of extremely low resistance and shall envelop the cylinder as completely as is consistent with its own most effective induction from the primary coil. For that purpose I have devised the form shown in the drawings and exhibited in detail in Figs. 4 and 5. It is of cast copper, made first in the form of a continuous shell, and then sawed in the manner indicated in the drawings, so as to present a combination of parallel rectangles held in form by an uncut mid-rib of the shell and narrowing or becoming gradually smaller in area from the interior outward, so as in a general manner to follow the conformation of the cylinder. It may be made, however, of copper bars or rods joined together in any convenient manner, so as to present a number of circuits of very low resistance.

It is important that the moving part of the mechanism shall combine the least inertia with the largest receptivity of electrical and magnetic energy. For this purpose the cylinder C is made of extremely thin sheet-copper and capped at its ends with a thin plate of aluminum for lightness and strength. This form of conductor has the advantages of a low resistance, of affording any desired length of conductor parallel with the sides of the inducing-coils, and of bringing a fresh mass of metal into the inducing-field at every instant of time. For similar reasons the disks d d d are made of very thin sheets of soft iron, and are placed normal to the axis of the cylinder, so that they shall revolve in their own planes. This construction concentrates in the disks the largest number of lines of force from the field of the inducing-coils in such manner as to secure the greatest energy and continuity of pull in the direction of revolution. It is obvious that the apparatus is capable of being used in an interrupted or pulsatory current also.

I claim—

1. An alternating-current meter containing, in combination, a fixed primary coil conveying the current to be measured, a secondary closed coil of low resistance fixed relatively to the primary coil, so that its central plane shall cut the central plane of the primary coil, a cylinder of electrical conducting material organized to revolve in inductive relation with said primary and secondary coils, and carrying-disks of magnetic material cutting the magnetic field of force of each of said coils, with a retarding device and devices for counting and indicating the revolutions of the cylinder.

2. In an alternating-current meter having a fixed primary coil conveying the current to be measured and a secondary closed coil in inductive relation therewith, a moving part consisting of a copper cylinder carrying soft-iron disks and revolving in inductive relation to both said coils.

3. The combination, for use in an alternating-current meter, of a copper cylinder and soft-iron disks placed normal to its axis rotating in the inductive field.

4. In an alternating-current meter, a secondary coil or conductor consisting of successively-narrowing rectangles of copper laterally joined together and enveloping that member of the mechanism to which motion is communicated by induction, substantially as shown.

5. In an alternating-current meter, a secondary coil or closed conductor consisting of copper circuits of low resistance, all in electrical multiple connection with each other, substantially as shown.

6. In an alternating-current meter, a secondary coil consisting of copper circuits of low resistance integrally joined together by a mid-rib, substantially as described.

7. In an alternating-current meter, a secondary coil made from a continuous shell of conducting material sawed into ribs and enveloping that member of the mechanism to which motion is communicated by induction, substantially as shown.

In testimony whereof I do hereto subscribe my name, in the presence of two witnesses, this 28th day of February, 1889.

MARMADUKE M. M. SLATTERY.

Witnesses:
J. E. TALBOT,
CHAS. C. MILLER.